(12) United States Patent
Lo et al.

(10) Patent No.: US 10,162,931 B2
(45) Date of Patent: Dec. 25, 2018

(54) METHOD OF FORMING SERPENTINE RESISTOR

(71) Applicant: TAIWAN SEMICONDUCTOR MANUFACTURING COMPANY LTD., Hsinchu (TW)

(72) Inventors: Wen-Shun Lo, Hsinchu County (TW); Hsin-Li Cheng, Hsinchu County (TW)

(73) Assignee: Taiwan Semiconductor Manufacturing Company Ltd., Hsinchu (TW)

( * ) Notice: Subject to any disclaimer, the term of this patent is extended or adjusted under 35 U.S.C. 154(b) by 18 days.

(21) Appl. No.: 15/471,433

(22) Filed: Mar. 28, 2017

(65) Prior Publication Data
US 2018/0285509 A1    Oct. 4, 2018

(51) Int. Cl.
| | |
|---|---|
| *G06F 17/50* | (2006.01) |
| *H01C 17/00* | (2006.01) |
| *H01C 7/22* | (2006.01) |
| *H01C 1/14* | (2006.01) |
| *H01L 49/02* | (2006.01) |

(52) U.S. Cl.
CPC ...... *G06F 17/5081* (2013.01); *G06F 17/5072* (2013.01); *H01C 1/14* (2013.01); *H01C 7/22* (2013.01); *H01C 17/00* (2013.01); *H01L 28/20* (2013.01); *G06F 2217/12* (2013.01)

(58) Field of Classification Search
CPC ........................ G06F 17/5081; G06F 17/5072
USPC ......................................................... 716/111
See application file for complete search history.

(56) References Cited

U.S. PATENT DOCUMENTS

| | | | |
|---|---|---|---|
| 7,418,683 B1 * | 8/2008 | Sonnard .............. | G06F 17/5081 716/122 |
| 2011/0066997 A1 * | 3/2011 | O'Riordan ............ | G06F 17/504 716/136 |

\* cited by examiner

*Primary Examiner* — Suchin Parihar
(74) *Attorney, Agent, or Firm* — Juan Carlos A. Marquez; Marquez IP Law Office, PLLC (57) ABSTRACT

A method of forming a serpentine resistor includes: setting a total length of a schematic resistor to make the schematic resistor to have a first resistance according to a sheet resistance; forming, by using a processor, a serpentine layer corresponding to the schematic resistor, forming, by using the processor, a dummy layer over a portion of the serpentine layer to form a modified serpentine layer, measuring, by using the processor, a modified length of the modified serpentine layer, and comparing, by using the processor, the total length and the modified length to generate a comparison result.

17 Claims, 11 Drawing Sheets

METHOD OF FORMING SERPENTINE RESISTOR

BACKGROUND

Semiconductor resistors are widely used in integrated circuits. In a manufacturing process, semiconductor resistors may be formed by depositing a plurality of polysilicon layers over a substrate. Semiconductor resistors may be employed to form control circuits of integrated circuits. Therefore, the accuracy of the resistances of these semiconductor resistors is required for the integrated circuits. However, the resistance of a resistor may deviate from a desired value after the resistor is manufactured by a semiconductor manufacturing process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 1:
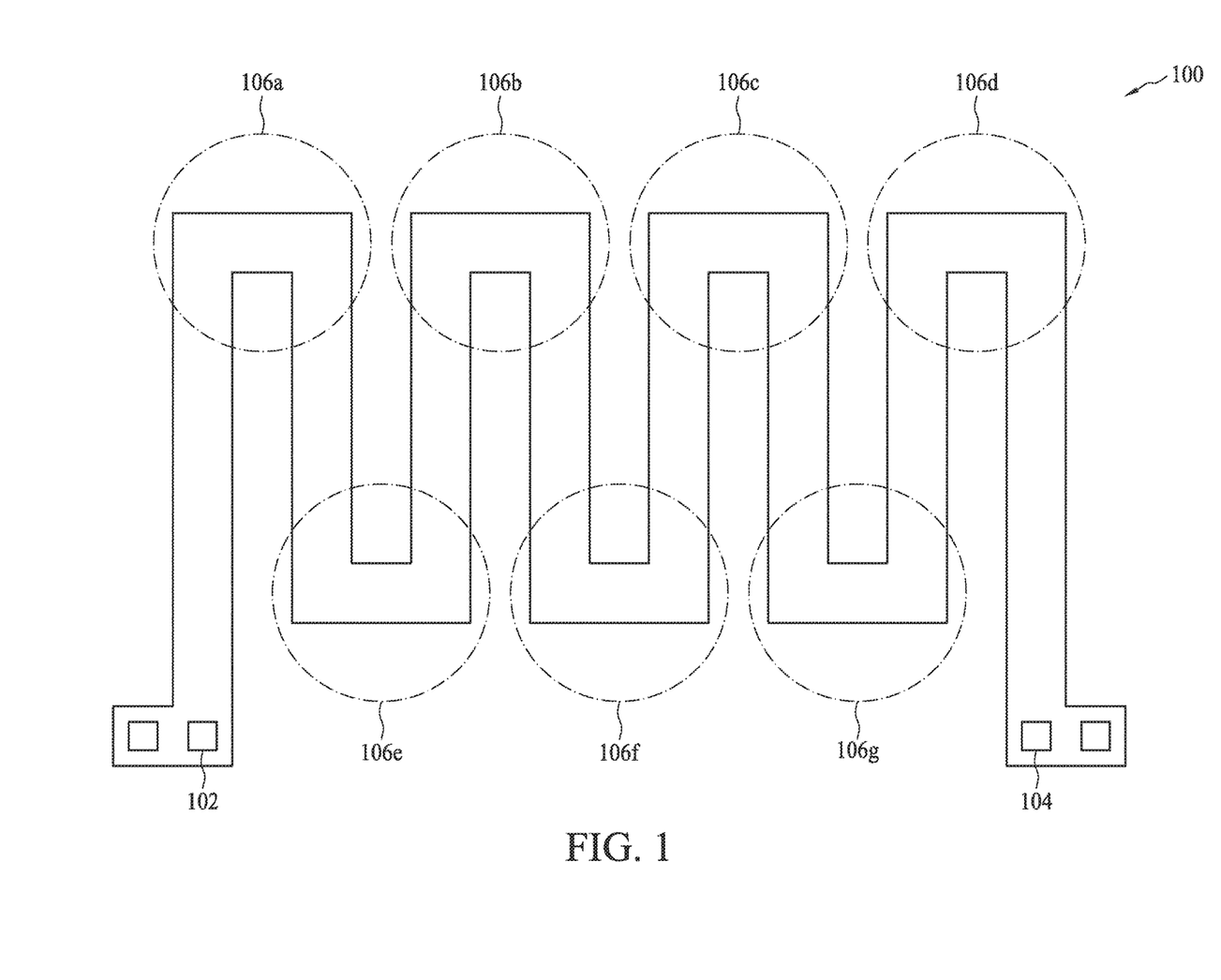
FIG. 1 is a diagram illustrating a layout of a serpentine resistor in accordance with some embodiments.

FIG. 1 is a diagram illustrating a layout 100 of a serpentine resistor in accordance with some embodiments. The layout 100 is an ideal pattern designed by a circuit designer to achieve a predetermined resistance. The layout 100 may be illustrated through a monitor of a computing device. According to some embodiments, the layout 100 is a serpentine layer comprising a first contact pad 102, a second contact pad 104, and a plurality of square-corner switchback traces 106a-106g. Based on a predetermined sheet resistance, the serpentine layer is designed with a width and a total length measured from the first contact pad 102 via the square-corner switchback traces 106a-106g to the second contact pad 104 such that the serpentine layer has the predetermined resistance.

Figure 2:
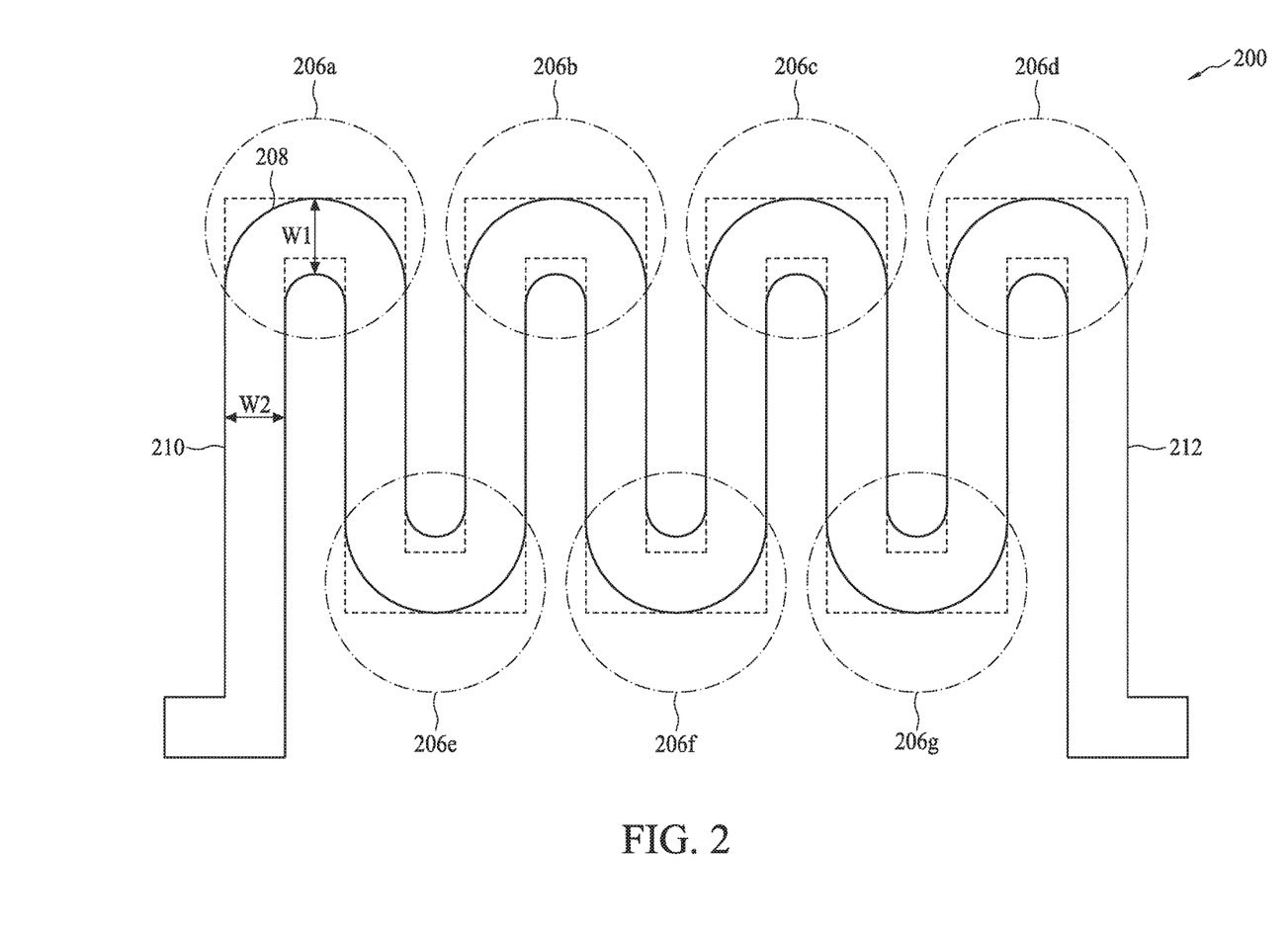
FIG. 2 is a diagram illustrating a fabricated serpentine resistor in accordance with some embodiments.

According to the layout 100 of the serpentine resistor, by a semiconductor manufacturing process, a physical serpentine resistor is formed. FIG. 2 is a diagram illustrating a fabricated serpentine resistor 200 in accordance with some embodiments. For illustration purpose, the shape of the layout 100 is shown by dotted lines 212 in FIG. 2. The shape of the fabricated serpentine resistor 200 may not be identical with the shape of the layout 100 of the serpentine resistor due to manufacturing process factors. For example, the switchback traces 206a-206g of the fabricated serpentine resistor 200 become U-shaped traces instead of square-corner traces. The width and the total length of the fabricated serpentine resistor 200 may be different from the width and the total length of the layout 100, respectively. Furthermore, the width W1 of the horizontal trace 208 is greater than the width W2 of the vertical trace 210. Accordingly, the resistance of the fabricated serpentine resistor 200 may be different from the predetermined resistance of the layout 100. In other words, the sheet resistance of the fabricated serpentine resistor 200 may be different from the predetermined sheet resistance of the layout 100.

To solve the above problems, an adjustment is made on the layout 100 before the layout 100 is fabricated by a semiconductor manufacturing process.

Figure 3:
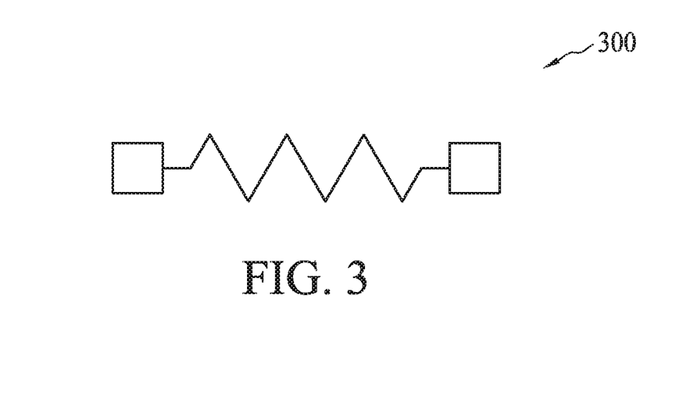
FIG. 3 is a schematic diagram illustrating a schematic resistor of a serpentine resistor in accordance with some embodiments.

FIG. 3 is a schematic diagram illustrating a schematic resistor 300 of a serpentine resistor in accordance with some embodiments. The schematic resistor 300 is characterized by a predetermined sheet resistance Rs. Sheet resistance is a measure of resistance of thin films that are nominally uniform in thickness. The unit of sheet resistance is ohms per square (ohm/sq). The schematic resistor 300 is a built-in standard model, e.g. SPICE model, of a circuit simulating software running in a computer system having at least one processor. A designer may input a total length La into the circuit simulating software to set a target resistance Rt for the schematic resistor 300. Alternatively, the designer may directly input the target resistance Rt to set the schematic resistor 300. The circuit simulating software may automatically calculate the total length La and a width Wa of the serpentine resistor based on the predetermined sheet resistance Rs and the target resistance Rt. According to some embodiments, the width Wa may be a predetermined width in the circuit simulating software.

Figure 4:
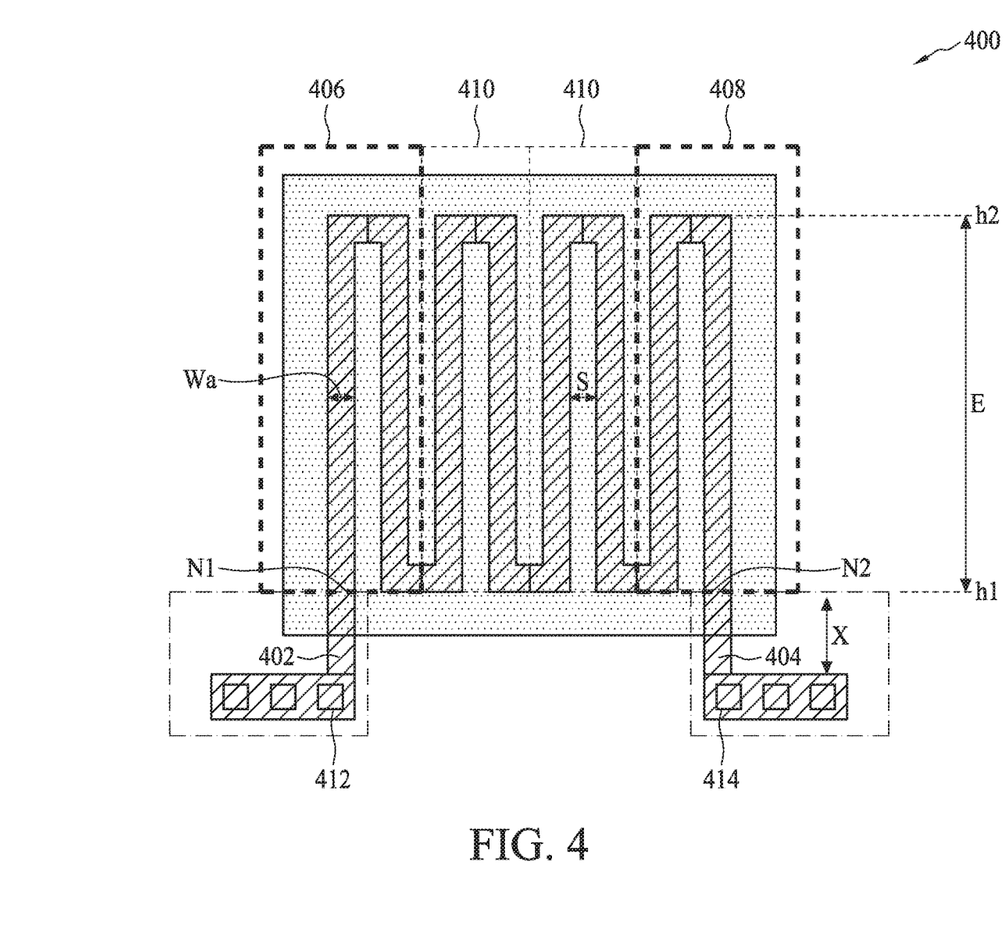
FIG. 4 is a diagram illustrating a serpentine layer in accordance with some embodiments.

FIG. 4 is a diagram illustrating a serpentine layer 400 of the serpentine resistor in accordance with some embodiments. The serpentine layer 400 is a layout of the serpentine resistor automatically created by a layout creating software based on the schematic resistor 300 with the parameters La and Wa set according to the embodiments in FIG. 3. The layout creating software may be executed by the similar computer system of the circuit simulating software. However, this is not a limitation of the present embodiment. According to some embodiments, the serpentine layer 400 comprises a first connection trace 402, a second connection trace 404, a first boundary square-corner switchback trace 406, a second boundary square-corner switchback trace 408, and a plurality of third square-corner switchback traces 410. The first connection trace 402 is coupled to a first contact pad 412 and a first terminal N1 of the first boundary square-corner switchback trace 406. The second connection trace 404 is coupled to a second contact pad 414 and a second terminal N2 of the second boundary square-corner switchback trace 408. The plurality of third square-corner switchback traces 410 is coupled between the first boundary square-corner switchback trace 406 and the second boundary square-corner switchback trace 408. The trace of the serpentine layer 400 has a width of Wa, which is a predetermined width. The serpentine layer 400 has a height E measured from the lower horizontal trace, i.e. the horizontal line h1, to the upper horizontal trace, i.e. the horizontal line h2. The first connection trace 402 and the second connection trace 404 have the same length X. It is noted that the first connection trace 402 and the second connection trace 404 may have different lengths. The width of the space between each two adjacent and parallel traces of the square-corner switchback traces is S. The number of loops of the plurality of third square-corner switchback traces 410 is B, B being an integer. According to some embodiments, the layout creating software derives the height E by the following functional equation (1):

$$La = 4(E-\varepsilon) + 3S + [2(E-\varepsilon) + 2S]*B + 2X \qquad (1)$$

The parameter La is the total length of the serpentine resistor set in the schematic resistor 300. The parameter $\varepsilon$ is a predetermined positive value. According to some embodiments, the parameter $\varepsilon$ is not greater than a third of the height E. In addition, the parameters S, X, and B have predetermined values. It is noted that, depending on the practical requirement, the values of the parameters S, X, and B may be adjusted by the designer via the layout creating software.

When the serpentine layer 400 is created by the layout creating software based on the functional equation (1), the total length measured from the first contact pad 412 to the second contact pad 414 of the serpentine layer 400 is greater than the total length La set in the schematic resistor 300 due to the parameter (E-$\varepsilon$) in the functional equation (1). In other words, the height of the serpentine layer 400 is increased by a value of $\varepsilon$ when the functional equation (1) is applied to derive the height E.

After the serpentine layer 400 corresponding to the schematic resistor 300 is created by the layout creating software, a verification between the serpentine layer 400 and the schematic resistor 300 is performed. The verification may be performed by an LVS (Layout Versus Schematic) checking software executed by the computer system. The Layout Versus Schematic (LVS) is the class of electronic design automation (EDA) verification software that determines whether a particular integrated circuit layout corresponds to the original schematic or circuit diagram of the design. During the verification process, the LVS checking software measures a total length of the serpentine layer 400, and performs a comparison between the total length and the length La. As mentioned above, the total length measured from the first contact pad 412 to the second contact pad 414 of the serpentine layer 400 is greater than the total length La set in the schematic resistor 300. Therefore, to make the total length of the serpentine layer 400 measured by the LVS checking software to be equal to the total length La of the schematic resistor 300, dummy layers are further formed on the serpentine layer 400 to make the modified total length of the serpentine layer 400 measured by the LVS checking software equal to the total length La of the schematic resistor 300.

Figure 5:
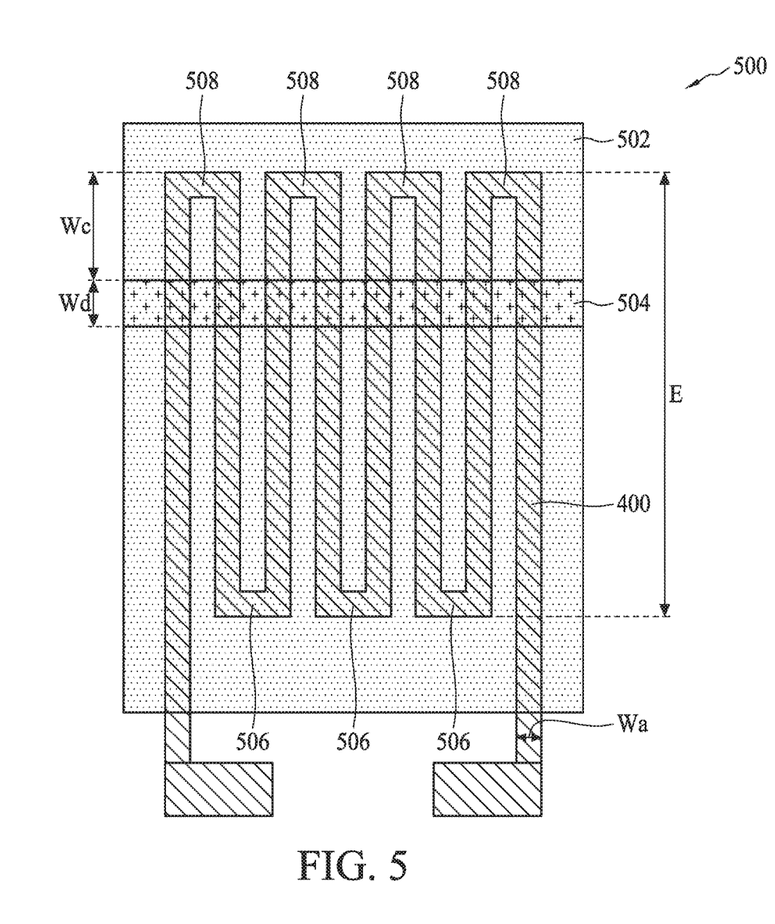
FIG. 5 is a diagram illustrating a modified serpentine layer in accordance with some embodiments.

FIG. 5 is a diagram illustrating a modified serpentine layer 500 of the serpentine resistor in accordance with some embodiments. The modified serpentine layer 500 is formed by the above-mentioned layout creating software. The modified serpentine layer 500 comprises the serpentine layer 400, a first dummy layer 502, and a second dummy layer 504. According to some embodiments, the first dummy layer 502 is overlapped with the serpentine layer 400 except for the first contact pad 412 and the second contact pad 414. The second dummy layer 504 is a rectangular dummy layer overlapped with a portion of the serpentine layer 400. The second dummy layer 504 has a width Wd. The width Wd is substantially equal to the value of the parameter ε of the functional equation (1). However, this is not a limitation of the present embodiment. The width Wd may be a value not greater than a third of the height E. According to some embodiments, the second dummy layer 504 is horizontally disposed across the parallel and vertical traces of the square-corner switchback traces 406, 408, and 410 of the serpentine layer 400. It is noted that the second dummy layer 504 is not overlapped with lower horizontal traces 506 and upper horizontal traces 508, located proximal to and remote from the contact pads 412, 414, respectively, of the serpentine layer 400. For example, a distance between the second dummy layer 504 and the upper horizontal traces 508 is Wc, and the distance Wc is smaller than the height E.

During the verification, the LVS checking software applies the following functional equation (2) to calculates the modified length Lc of the serpentine layer 400:

$$Lc=[(A1 \cap A2)-(A1 \cap A3)]/Wa \qquad (2)$$

The operator "∩" is an operator for measuring an intersection of two areas. The parameter A1 is the area of the serpentine layer 400, the parameter A2 is the area of the first dummy layer 502, and the parameter A3 is the area of the second dummy layer 504. Wa is the width of the trace of the serpentine layer 400. Therefore, the term (A1∩A2) represents the overlapping area of the area A1 of the serpentine layer 400 and the area A2 of the first dummy layer 502, and the term (A1∩A3) represents the overlapping area of the area A1 of the serpentine layer 400 and the area A3 of the second dummy layer 504. When a difference between the term (A1∩A2) and the term (A1∩A3) is divided by the width Wa of the trace of the serpentine layer 400, a length, i.e. Lc, deducting the portion overlapped by the second dummy layer 504 is obtained. As the width Wd of the second dummy layer 504 is substantially equal to the value of the parameter ε used in the functional equation (1), the modified length Lc obtained in the LVS checking software is equal to the total length La set in the schematic resistor 300. In other words, the LVS checking software measures the total length of the whole trace of the serpentine layer 400, and measures the total length of a portion of trace that is overlapped with the second dummy layer 504. Then, the LVS checking software calculates the modified length Lc by subtracting the total length of the portion of trace from the total length of the whole trace.

In addition, the LVS checking software compares the modified length Lc and the total length La and then generates a comparison result. If the comparison result indicates the modified length Lc substantially equals to the total length La, the LVS checking software determines that the resistance of the modified serpentine layer substantially equals the target resistance Rt of the schematic resistor 300. Accordingly, the LVS checking software passes the verification between the modified serpentine layer 500 and the schematic resistor 300.

Accordingly, by adding the second dummy layer 504 on the serpentine layer 400, the LVS checking software may obtain the modified length Lc substantially equal to the total length La even though the total length from the first contact pad 412 to the second contact pad 414 of the serpentine layer 400 is greater than the total length La.

When the modified serpentine layer 500 passes the verification of the LVS checking software, the modified serpentine layer 500 may be fabricated by a semiconductor manufacturing process to form a physical serpentine resistor. It is noted that the first dummy layers 502 and 504 are merely used for calculating the modified length Lc of the serpentine layer 400 during the LVS checking software, and the first dummy layers 502 and 504 are not fabricated in the semiconductor manufacturing process. In other words, the first dummy layers 502 and 504 are discarded during the semiconductor manufacturing process.

As mentioned in the above paragraphs, when the serpentine resistor of the modified serpentine layer 500 is fabricated, the shape of the fabricated serpentine resistor may not be identical with the shape of the serpentine layer 400 of the serpentine resistor due to the semiconductor manufacturing process. For example, the switchback traces of the fabricated serpentine resistor become U-shaped traces instead of square-corner traces. However, as the height E of the serpentine layer 400 has been adjusted or increased by a value of ε during the forming of the serpentine layer 400 by the layout creating software, the resistance of the fabricated serpentine resistor may be the same as the target resistance Rt of the schematic resistor 300 during the simulation stage. In other words, the sheet resistance of the fabricated serpentine resistor may be the same as the predetermined sheet resistance Rs of the schematic resistor 300.

Figure 6:
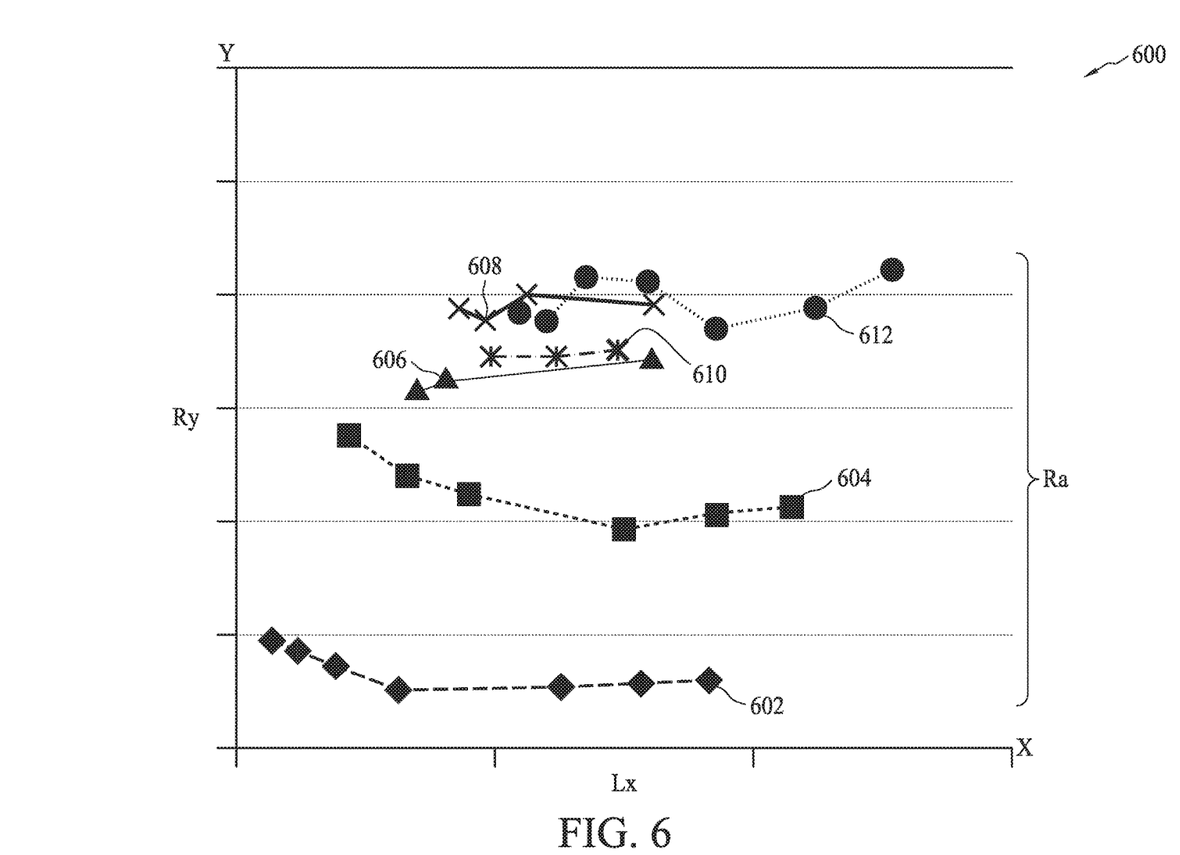
FIG. 6 is a diagram illustrating relationships among total lengths, sheet resistances, and heights of a plurality of fabricated serpentine resistors.

FIG. 6 is a diagram illustrating relationships among the total lengths, the sheet resistances, and the heights of a plurality of fabricated serpentine resistors without correcting the height of the corresponding layouts. X-axis represents the total length Lx of a fabricated serpentine resistor. Y-axis represents the sheet resistance Ry of the fabricated serpentine resistor. Curves 602 to 612 indicate the variations of the sheet resistances in respect to the total lengths of a plurality of fabricated serpentine resistors with the heights E1 to E6, respectively. In addition, the first height E1 is the minimum height, the sixth height E6 is the maximum height, and the heights E2 to E5 are within the range between E1 and E6. It can be seen that, without using the presented functional equation (1) to correct the height of the corresponding layouts, the sheet resistances Ry of the fabricated serpentine resistors are strongly dependent on their respective heights. The sheet resistances Ry distribute in a relatively large range Ra. In other words, the resistances of the fabricated serpentine resistors have a large variation. This behavior obviously has a negative impact on the accuracy of the schematic model, which normally has one parameter (i.e. the total length) to be adjusted.

Figure 7:
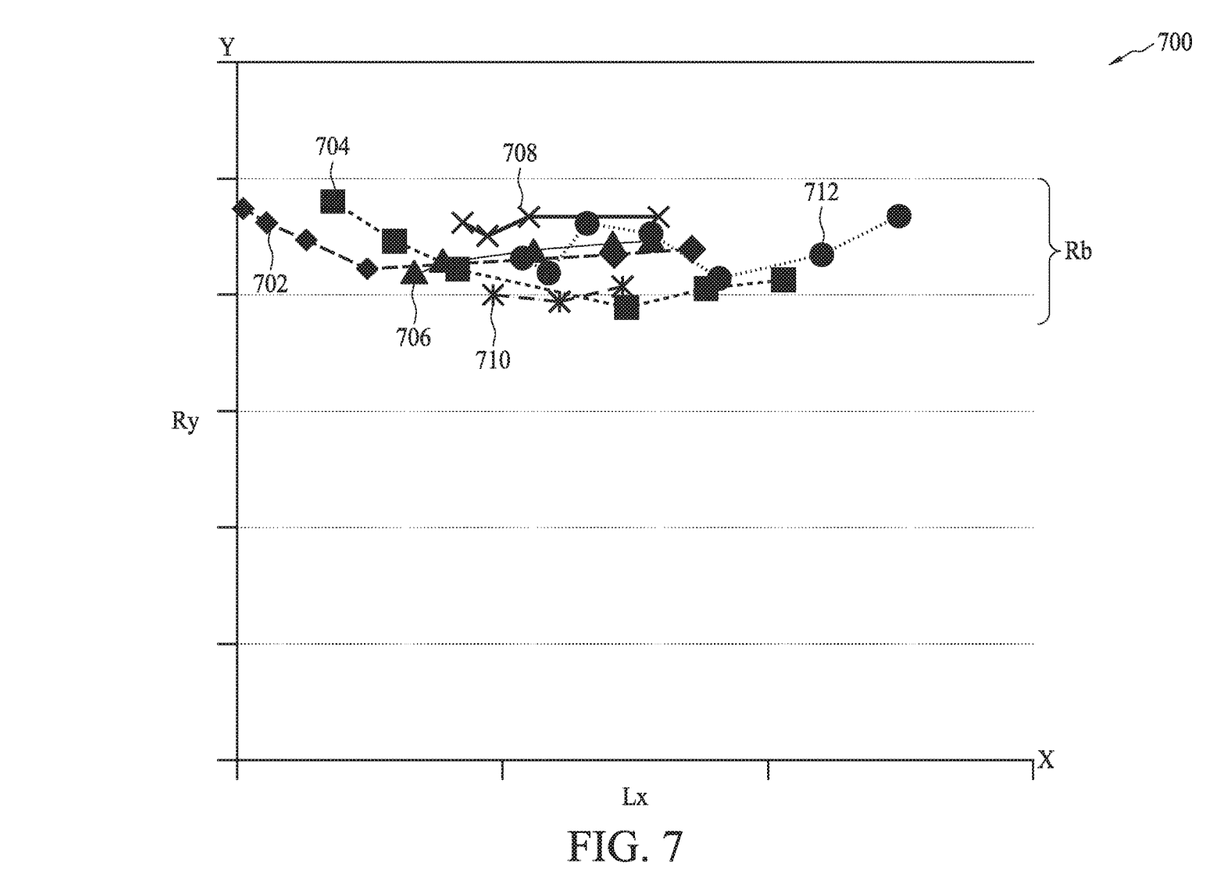
FIG. 7 is a diagram illustrating relationships among total lengths, sheet resistances, and heights of a plurality of fabricated serpentine resistors in accordance with some embodiments.

FIG. 7 is a diagram illustrating relationships among the total lengths, the sheet resistances, and the heights of a plurality of fabricated serpentine resistors in accordance with some embodiments. In FIG. 7, the heights of the fabricated serpentine resistors are corrected by using the above functional equation (1). X-axis represents the total length Lx of a fabricated serpentine resistor. Y-axis represents the sheet resistance Ry of the fabricated serpentine resistor. Curves 702 to 712 indicate the variations of the sheet resistances in respect to the total lengths of a plurality of fabricated serpentine resistors with the corrected heights E1 to E6, respectively. In addition, the first height E1 is the minimum height, the sixth height E6 is the maximum height, and the heights E2 to E5 are within the range between E1 and E6. It can be seen that, by using the presented functional equation (1) to correct the height of the corresponding layouts, the variation of the sheet resistances Ry of the fabricated serpentine resistors is improved in comparison to the sheet resistances Ry in FIG. 6. Specifically, the variation of the sheet resistances Ry of the fabricated serpentine resistors falls within a relatively small range Rb in comparison to the range Ra of sheet resistance in respect to the total lengths. In other words, the sheet resistances Ry of the fabricated serpentine resistors are relatively independent on their heights respectively in comparison to FIG. 6. Accordingly, the sheet resistance can be accurately modeled in the schematic model with one parameter (i.e. the total length), and the effective length can be aligned with the LVS checking software and the circuit simulating software.

Figure 8:
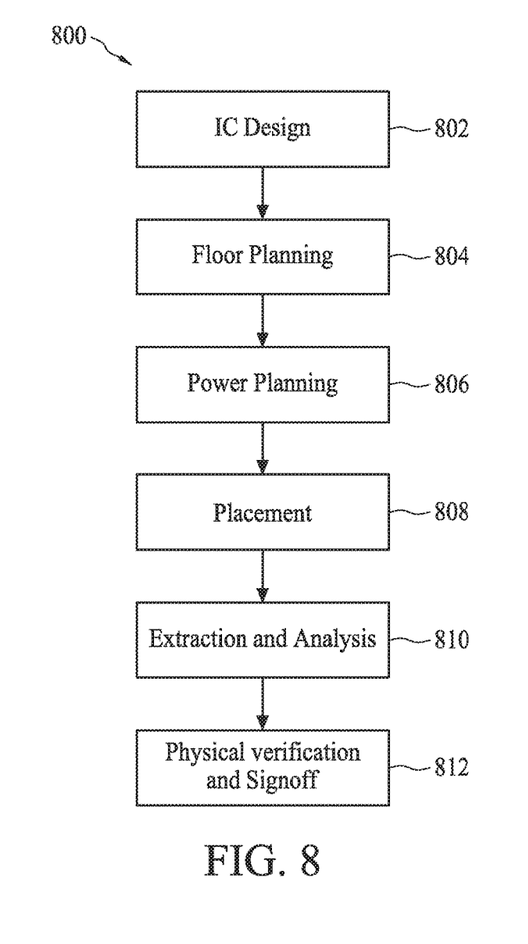
FIG. 8 is a flow chart of a design flow of an IC chip in accordance with some embodiments.

FIG. 8 is a flow chart of a design flow 800 of an IC (Integrated Circuit) chip including a serpentine resistor in accordance with some embodiments. The design flow 100 utilizes one or more electronic design automation (EDA) tools to carry out one or more operations in the design flow 800.

At an IC design stage 802, a high-level design of the IC chip is provided by a circuit designer. In some embodiments, a gate-level netlist is generated through logic synthesis based on the high-level design and gates in the gate-level netlist are mapped to available cells in a standard cell library. The term "netlist" used herein refers to both graphical-based representation such as a schematic and/or a text-based representation of a circuit.

At a floor planning stage 804, the gate-level netlist is partitioned into functional blocks and a floorplan for the functional blocks in a design layout of the IC chip is created.

At a power planning stage 806, power meshes such as a VDD power (e.g. the supply voltage) mesh and a VSS power (e.g. the ground voltage) mesh are routed. The power mesh includes several metal layers. Each metal layer includes power lines or power rails running, for example, horizontally or vertically. The metal layers are stacked such that any adjacent metal layers have the power lines or power rails running in, for example, orthogonal directions.

At a placement stage 808, mapped cells of logic gates and registers in the blocks are placed at specific locations in the design layout.

At a parasitic extraction and analysis stage 810, the design layout, which includes the routing, is analyzed to extract the parasitic in the design layout and accordingly generate a physical netlist.

At a physical verification and signoff stage 812, layout-versus-schematic (LVS) is performed on a physical netlist generated from the design layout to ensure correspondence of the design layout to the gate-level netlist. Further, design rule check (DRC) is performed on the design layout to ensure the design clean of, for example, electrical issues and lithographic issues for manufacturing. Incremental fixing can be performed to achieve final signoff of the IC chip design before tape-out.

According to some embodiments, the designer inputs the target resistance Rt into the circuit simulating software to set the schematic resistor 300 during the IC design stage 802. The layout creating software may create the serpentine layer 400 or 500 during the floor planning stage 804. The modified serpentine layer 500 may be created the layout creating software during the physical verification stage 812. In addition, the LVS checking software performs the verification between the modified serpentine layer 500 and the schematic resistor 300 during the physical verification stage 812.

Figure 9:
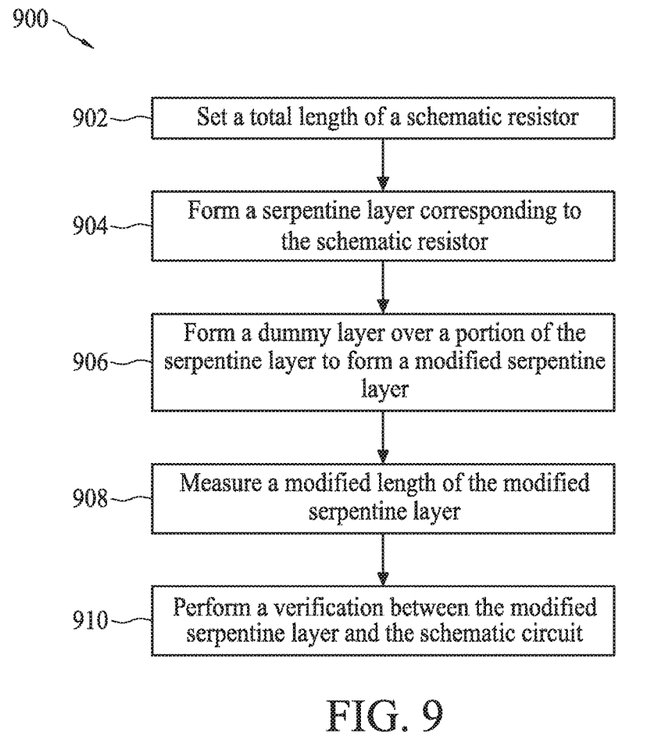
FIG. 9 is a flow diagram illustrating a method of forming a serpentine resistor in accordance with some embodiments.

According to some embodiments, the process of forming of a serpentine resistor may be summarized into the steps in FIG. 9. FIG. 9 is a flow diagram illustrating a method 900 of forming a serpentine resistor in accordance with some embodiments. The method 900 may be performed in the IC design stage 802, the floor planning stage 804, and the physical verification stage 812. In operation 902, a schematic resistor is set by a total length based on a sheet resistance such that the schematic resistor has a first resistance. The operation 902 may be performed in the IC design stage 802.

In operation 904, a serpentine layer corresponding to the schematic resistor is formed. The height of the serpentine layer is derived from the above-mentioned functional equation (1). The operation 904 may be performed in the floor planning stage 804.

In operation 906, a modified serpentine layer having a dummy layer over a portion of the serpentine layer is formed. The dummy layer is a rectangular layer with a width not greater than a third of the height of the serpentine layer. The dummy layer is horizontally disposed across the first square-corner switchback trace, the at least one third square-corner switchback trace, and the second square-corner switchback trace of the serpentine layer. The operation 906 may be performed in the floor planning stage 804.

In operation 908, a modified length of the modified serpentine layer is measured. The operation 908 may be performed in the physical verification stage 812.

In operation 910, a verification between the modified serpentine layer and the schematic resistor is performed. The verification is performed by comparing the total length and the modified length, and a comparison result is generated. When the comparison result indicates the total length substantially equal to the modified length, determining that the modified serpentine layer having a second resistance substantially equal to the first resistance. The operation 910 may be performed in the physical verification stage 812.

Figure 10:
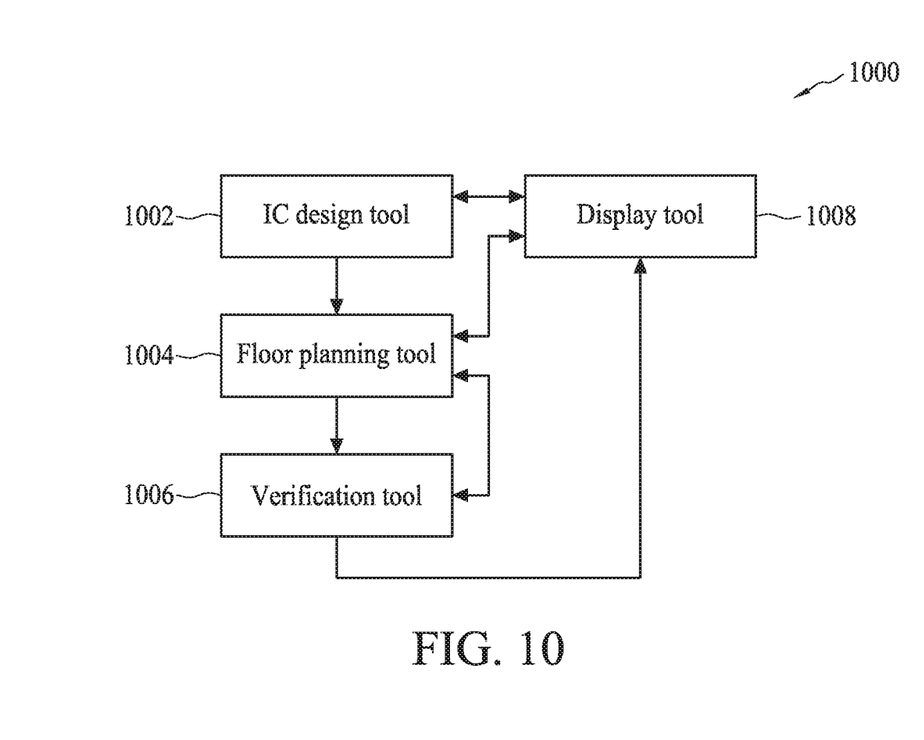
FIG. 10 is a functional block diagram of a software system of forming a serpentine resistor in accordance with some embodiments.

FIG. 10 is a functional block diagram of a software system 1000 of forming a serpentine resistor described with reference to FIG. 5 and FIG. 9 in accordance with some embodiments. In some embodiments, the software system 1000 includes an IC design tool 1002, a floor planning tool 1004, a verification tool 1006, and a display tool 1008. The above-mentioned tool may also be software. The IC design tool 1002 is arranged to perform the operation 902 of the method 900. The floor planning tool 1004 is arranged to perform the operations 904 and 906 of the method 900. The verification tool 1006 is arranged to perform the operations 908 and 910 of the method 900. The display tool 1008 is configured to display the above-mentioned schematic resistor 300, the serpentine layer 400, and the modified serpentine layer 500 of the above embodiments.

Figure 11:
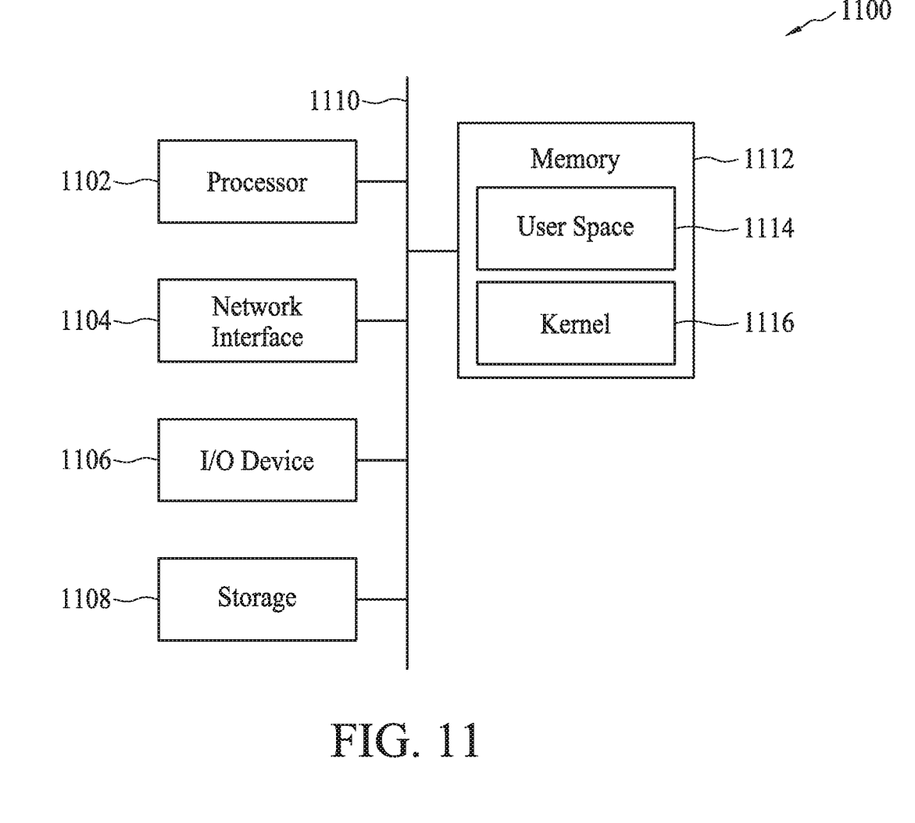
FIG. 11 is a block diagram of a hardware system for implementing a method of forming a serpentine resistor in accordance with some embodiments.

FIG. 11 is a block diagram of a hardware system 1100 for implementing the method of forming a serpentine resistor described with reference to FIG. 5 and FIG. 10 in accordance with some embodiments. The system 1100 includes at least one processor 1102, a network interface 1104, an input and output (I/O) device 1106, a storage 1108, a memory 1112, and a bus 1110. The bus 1110 couples the network interface 1104, the I/O device 1106, the storage 1108 and the memory 1112 to the processor 1102.

In some embodiments, the memory 1112 comprises a random access memory (RAM) and/or other volatile storage device and/or read only memory (ROM) and/or other non-volatile storage device. The memory 1112 includes a kernel 1116 and user space 1114, configured to store program instructions to be executed by the processor 1102 and data accessed by the program instructions.

In some embodiments, the network interface 1104 is configured to access program instructions and data accessed by the program instructions stored remotely through a network. The I/O device 1106 includes an input device and an output device configured for enabling user interaction with the system 1100. The input device comprises, for example, a keyboard, a mouse, etc. The output device comprises, for example, a display, a printer, etc. The storage device 1108 is configured for storing program instructions and data accessed by the program instructions. The storage device 1108 comprises, for example, a magnetic disk and an optical disk.

In some embodiments, when executing the program instructions, the processor 1102 is configured to execute the IC design tool 1002, the floor planning tool 1004, and the verification tool 1006 described with reference to FIG. 10.

In some embodiments, the program instructions are stored in a non-transitory computer readable recording medium such as one or more optical disks, hard disks and non-volatile memory devices.

According to some embodiments, a method of forming a serpentine resistor is provided. The method comprises: setting a total length of a schematic resistor to make the schematic resistor to have a first resistance according to a sheet resistance; forming, by using a processor, a serpentine layer corresponding to the schematic resistor; forming, by using the processor, a dummy layer over a portion of the serpentine layer to form a modified serpentine layer; measuring, by using the processor, a modified length of the modified serpentine layer; and comparing, by using the processor, the total length and the modified length to generate a comparison result.

According to some embodiments, a method of forming a serpentine resistor is provided. The method comprises: forming, by using a processor, a serpentine layer corresponding to a schematic resistor; and forming, by using the processor, a dummy layer over a portion of the serpentine layer to form a modified serpentine layer.

According to some embodiments, a method of forming a serpentine resistor is provided. The method comprises: setting a first total length of a schematic resistor to make the schematic resistor to have a first resistance; and forming, by using a processor, a modified serpentine layer corresponding to the schematic resistor; wherein the modified serpentine layer has a second total length greater than the first total length.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a serpentine resistor, comprising:
    setting a total length of a schematic resistor to make the schematic resistor to have a first resistance according to a sheet resistance;
    forming, by using a processor, a serpentine layer corresponding to the schematic resistor;
    forming, by using the processor, a dummy layer over a portion of the serpentine layer to form a modified serpentine layer;
    measuring, by using the processor, a modified length of the modified serpentine layer;
    comparing, by using the processor, the total length and the modified length to generate a comparison result; and
    fabricating a physical serpentine resistor in response to the comparison result, wherein the step of forming the serpentine layer corresponding to the schematic resistor comprises:
    forming the serpentine layer with a height, and the height is derived by a functional equation:

$$L=f(E-\varepsilon),$$

the parameter L representing the total length, the parameter E representing the height, and the parameter $\varepsilon$ being a predetermined positive value.

2. The method of claim 1, wherein when the comparison result indicates the total length substantially equal to the modified length, the method further comprises:
    determining, by using the processor, the modified serpentine layer having a second resistance substantially equal to the first resistance.

3. The method of claim 1, wherein the dummy layer is a rectangular layer with a width smaller than a height of the serpentine layer, wherein the height is measured from a lower horizontal trace to an upper horizontal trace of the serpentine layer.

4. The method of claim 3, wherein the width of the dummy layer is not greater than a third of the height of the serpentine layer.

5. The method of claim 3, wherein the dummy layer is disposed between the lower horizontal trace and the upper horizontal trace.

6. The method of claim 5, wherein the dummy layer is not overlapped with the lower horizontal trace and the upper horizontal trace.

7. The method of claim 1, wherein the predetermined positive value is not greater than a third of the height.

8. The method of claim 1, wherein the serpentine layer comprises:
    a first square-corner switchback trace, having a first terminal;
    at least one third square-corner switchback traces, coupled to the first square-corner switchback trace;
    a second square-corner switchback trace, having a second terminal;
    a first connection trace, coupled to the first terminal and a first contact pad; and
    a second connection trace, coupled to the second terminal and a second contact pad;
    wherein the functional equation is:

$$L=4(E-\varepsilon)+3S+[2(E-\varepsilon)+2S]*B+2X,$$

wherein the parameter L represents the total length, the parameter E represents the height, the parameter $\varepsilon$ is a predetermined positive value, the parameter S is a width of adjacent and parallel traces of the serpentine layer, the parameter B is a number of the at least one third square-corner switchback trace, and the parameter X is a length of first connection trace or the second connection trace.

9. The method of claim 1, wherein measuring the modified length of the modified serpentine layer comprises:
    measuring a first length of the portion of the serpentine layer that is overlapping with the dummy layer;
    measuring a second length of the serpentine layer; and
    calculating the modified length of the modified serpentine layer by subtracting the second length from the first length.

10. A method of forming a serpentine resistor, comprising:
forming, by using a processor, a serpentine layer corresponding to a schematic resistor;
forming, by using the processor, a dummy layer over a portion of the serpentine layer to form a modified serpentine layer; and
fabricating a physical serpentine resistor in response to the modified serpentine layer, wherein
the step of forming the serpentine layer corresponding to the schematic resistor comprises:
setting a total length of the schematic resistor to make the schematic resistor to have a first resistance according to a sheet resistance; and
forming the serpentine layer with a height, and the height is derived by a functional equation:

$$L=f(E-\varepsilon),$$

the parameter L representing the total length, the parameter E representing the height, and the parameter ε being a predetermined positive value.

11. The method of claim 1, wherein the height is measured from a lower horizontal trace to an upper horizontal trace of the serpentine layer.

12. The method of claim 11, wherein the dummy layer is not overlapped with the lower horizontal trace and the upper horizontal trace.

13. The method of claim 1, wherein the predetermined positive value is not greater than a third of the height.

14. The method of claim 1, wherein the dummy layer is a rectangular layer with a width substantially equal to the predetermined positive value ε.

15. The method of claim 1, wherein the serpentine layer comprises:
a first square-corner switchback trace, having a first terminal;
at least one third square-corner switchback trace, coupled to the first square-corner switchback trace;
a second square-corner switchback trace, having a second terminal;
a first connection trace, coupled to the first terminal and a first contact pad; and
a second connection trace, coupled to the second terminal and a second contact pad;
wherein the functional equation is:

$$L=4(E-\varepsilon)+3S+[2(E-\varepsilon)+2S]*B+2X,$$

the parameter L represents the total length, the parameter E represents the height, the parameter ε is a predetermined positive value, the parameter S is a width of two adjacent and parallel traces of the serpentine layer, the parameter B is a number of the at least one third square-corner switchback trace, and the parameter X is a length of first connection trace or the second connection trace.

16. The method of claim 15, wherein the dummy layer is a rectangular layer horizontally disposed across the first square-corner switchback trace, the at least one third square-corner switchback trace, and the second square-corner switchback trace.

17. A method of forming a serpentine resistor, comprising:
setting a first total length of a schematic resistor to make the schematic resistor to have a first resistance;
forming, by using a processor, a modified serpentine layer corresponding to the schematic resistor;
wherein the modified serpentine layer has a second total length greater than the first total length; and
fabricating a physical serpentine resistor in response to the modified serpentine layer, wherein the modified serpentine layer comprises:
a first square-corner switchback trace, having a first terminal;
at least one third square-corner switchback traces, coupled to the first square-corner switchback trace;
a second square-corner switchback trace, having a second terminal;
a first connection trace, coupled to the first terminal and a first contact pad;
a second connection trace, coupled to the second terminal and a second contact pad; and
a rectangular dummy layer horizontally disposed across the first square-corner switchback trace, the at least one third square-corner switchback trace, and the second square-corner switchback trace.

* * * * *